(No Model.)

C. C. FAIRLAMB.
MILK PAN COVER.

No. 255,263.                      Patented Mar. 21, 1882.

Witnesses
W. C. Coolies
Jno. C. MacGregor

Inventor
Charles C. Fairlamb
By Osburn Thacher
Attorneys

N. PETERS. Photo-Lithographer, Washington, D. C.

UNITED STATES PATENT OFFICE.

CHARLES C. FAIRLAMB, OF CHICAGO, ILLINOIS.

MILK-PAN COVER.

SPECIFICATION forming part of Letters Patent No. 255,263, dated March 21, 1882.

Application filed August 25, 1881. (No model.)

*To all whom it may concern:*

Be it known that I, CHARLES C. FAIRLAMB, a citizen of the United States, residing at Chicago, in the county of Cook, in the State of Illinois, have invented certain new and useful Improvements in Milk-Pan Covers, which are fully set forth in the following specification, reference being had to the accompanying drawings, in which—

Figure 1:
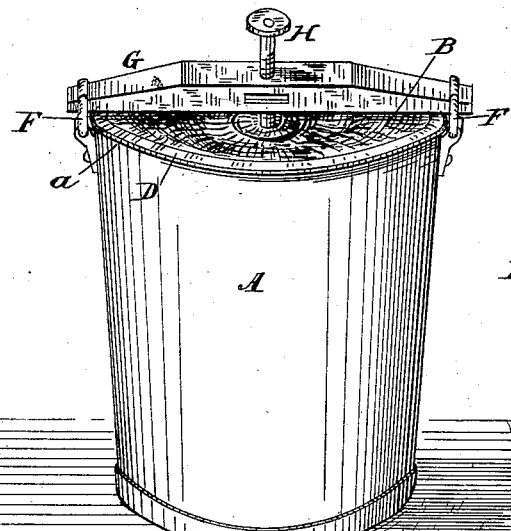
Figure 2:
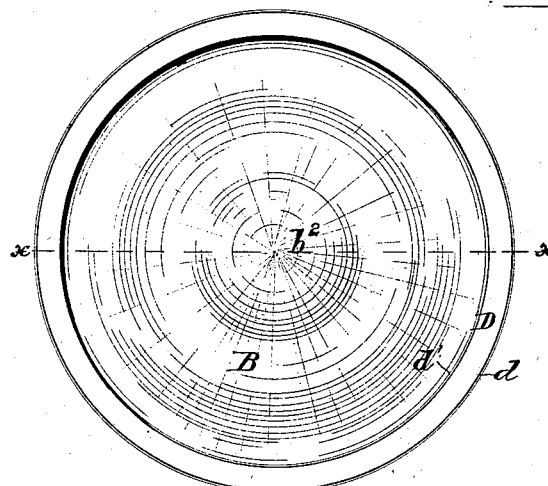
Figure 3:
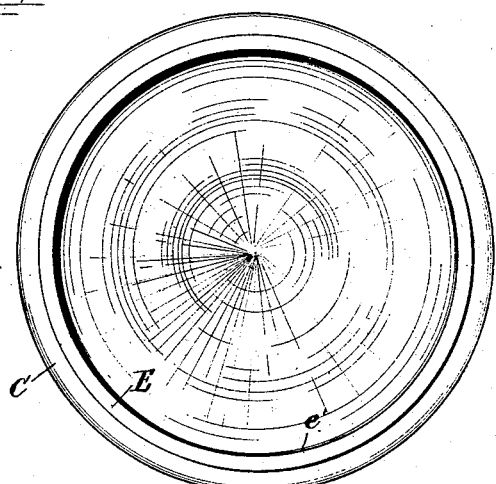
Figure 4:
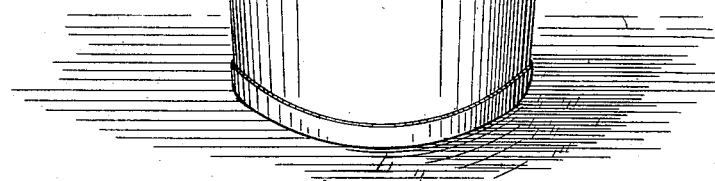

Figure 1 represents a perspective view of the milk-pan with my improved cover applied and secured; Fig. 2, a top plan of the cover; Fig. 3, a bottom plan of the same; Fig. 4, a transverse section of the same, taken on the line $x\ x$ in Fig. 2; and Fig. 5, a detail section of the pan and cover at one side on an enlarged scale.

My invention relates to the construction of air-tight covers for milk-pans, and is an improvement upon a cover for which Letters Patent No. 208,900 were granted to me October 15, 1878, and is intended for application to pans such as shown in the above-named patent, or Letters Patent No. 215,812, granted to me May 27, 1879, or pans of any other construction to which the cover is adapted.

The invention consists in the employment of special elastic material for making the air-tight joint and special devices for attaching the same to the cover, all of which will be hereinafter fully described in detail, and the special improvements which it is desired to secure by Letters Patent pointed out definitely in the claims.

The advantages attending the use of an air-tight cover with milk-pans are fully set forth in my patent of October 15, 1878, above mentioned, and I shall not rehearse them here. In providing such a cover, however, for ordinary dairy use I have found considerable difficulty. If the covers are not carefully washed, some milk or cream will remain in the joints, which, becoming sour, will taint the cream and butter, and this difficulty is increased if the band at the joint is of fibrous material, for, as is well known, the taint of sour milk or cream will remain in such fabric and be increased by repeated use. If an all-rubber band is used, it is soon worn away at the edges and joints by repeated washing in hot water, and becomes unfit for use. It is the object of my improvement to avoid these difficulties and provide an air-tight cover which will be durable, and at the same time may be kept sweet and clean.

In the drawings, A represents the milk-pan, and B the body of the cover, which is of a diameter sufficient to permit the outer edge to lie over and rest upon the upper edge, $a$, of the pan, which may be turned over, as shown in the drawings. This cover is preferably a disk of sheet metal, though it may be of other suitable material, if desired. The extreme outer edge is turned upward and inward to form a biting or clamping edge, $b$, and on the under side, a little way in from the edge, is a depression or groove, $b'$, both of course being annular.

Figure 5:
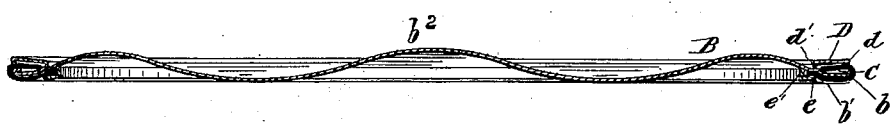

I have found rubber-cloth—that is, a cloth fabric covered with rubber on one side—to be the best material for making the joint between the cover and pan air-tight, for reasons which will be hereinafter stated. For this purpose a band of suitable width is first cut from a cylinder of the material made of the required size—that is, of a diameter considerably less than the diameter of the cover. This elastic band C is now applied to the edge of the cover with the cloth face next to the metal, and is fastened on the upper side of the cover first by means of a metallic ring, D, the outer end of which is turned under to form a clamped edge, $d$, similar to that on the edge of the cover and body, while the inner edge is turned down nearly straight, to form a slight downwardly-projecting flange, $d'$. This inner flange passes down just inside the inner edge of the elastic band, and the ring is soldered to the cover around its inner edge. The ring is then swaged or pressed down upon the cover, when it is obvious that the elastic band will be firmly clamped and held between the outer edges of the latter parts. The inwardly-turned edges will be pressed into the material of the elastic band, and will effectually prevent the band from being pulled out, thereby making a very secure fastening for the latter upon the upper edge of the cover. If not already done, the band is then turned over and under the edge of the cover, when it will hug the under side of the latter by reason of its elasticity. A second clamping-ring, E, is now applied to the under side of the cover, the edges of the ring being upset to form flanges $e\ e'$, as shown in Fig. 5 of the drawings, the first of which is laid over the edge of the band, underneath the groove $b'$ in the cover, while the other flange rests upon the body of the cover just beyond the inner edge of the band. The band is then soldered to the cover and pressed down upon the pan, which will then be firmly held between the cover and the ring, the upturned edge of which, pressing the band into the groove, will firmly secure it, so that it is almost impossible to pull it out. The clamping-ring E is arranged so far inward that a comparatively broad surface of the elastic band is left uncovered on the under side of the cover, the rubber being on the outside and the cloth on the inside or next to the cover. When the cover is applied to the pan as described in my prior patents, and as shown in Figs. 1 and 5 of the drawings, this under surface of the band rests upon the edge of the pan, and by pressing down the cover a perfectly air-tight joint is formed. I have found it quite difficult to apply devices suitable for use with milk-pans to confine the cover, for the means for this purpose must be such as to insure the fitting of the cover all around the edge of the pan, and be easily removed without tipping the pan while it is set in the water.

I make the body of the cover with the central portion, $b^2$, raised slightly, as shown in Fig. 4 of the drawings, or, rather, the entire body is corrugated, the depressions running around the cover, so as to show a wavy line in cross-section, as seen in Fig. 4.

On the sides of the pan are two handles or loops, F. A bar, G, is laid across the top of the cover when the latter is applied to the pan, the ends being inserted in the loops or handles, respectively.

An ordinary set-screw, H, is mounted in the bar centrally, so that its lower end may be brought to the central portion of the cover, and upon turning down this screw the cover will be fitted closely and pressed tightly upon the edge of the pan all around. At the same time the loops tighten on the bar. This makes a very secure and satisfactory fastening, which, acting centrally, may be applied to and removed from the pan without danger of tilting the latter. But other fastening devices may be employed with my cover, and I do not confine myself to the fastening here shown, and, in fact, these fastening devices form no part of my present improvement.

In the construction of the cover shown and above described I am enabled to secure the elastic band to the cover, so that there is no danger of displacement. Both edges of the band are also perfectly covered and protected, and no liquid or dirt can reach them. I am also enabled to avail myself of the desirable elasticity of the rubber and durability of the cloth, for in use the wear is mostly upon the outer edge of the cover, or at the joint on the under side, the flat surface of the band being worn very slowly. Now, if the rubber surface is worn away somewhat at the places mentioned above, the inside cloth still holds the band in place and prevents the entrance of water or any other liquid inside the band. The band is therefore much more durable than clear rubber, and in fact will last as long as the flat portion remains entire.

Of course some changes may be made in the precise form and arrangement of the clamping-rings and edge of the cover, and the order of fastening the two together as described above may not be followed precisely, and yet the peculiar characteristics of my improvement remain. Therefore I do not limit myself to the precise details as set forth in the above description, provided the essential features of my improvement are retained.

Having thus described my invention, what I claim as new, and desire to secure by Letters Patent, is—

1. The cover-body B, in combination with an elastic band, C, of cylindrical form normally, and clamping-rings D and E, applied to the upper and under sides of the cover, clamping both edges of the band to the cover, substantially as described.

2. The cover-body B, having its outer edge turned inward, in combination with the cylindrical rubber-cloth band C, the upper clamping-ring, D, having its edges bent substantially as described, and the lower clamping-ring, E, having its edges upset substantially as described, whereby the band is securely fastened to the cover and its edges covered and protected, substantially as and for the purposes set forth.

3. The cover-body B, in combination with the elastic band C, the upper clamping-ring, D, extending nearly or quite to the outer edge of the cover, and the lower clamping-ring, E, arranged nearly or quite inside the upper ring, whereby a wide surface of the band is left exposed on the under side of the cover, substantially as and for the purposes set forth.

CHARLES C. FAIRLAMB.

Witnesses:
JNO. C. MACGREGOR,
W. C. CORLIES.